K. P. KIDDER.
Bee Hive.
No. 64,773.  Patented May 14, 1867.
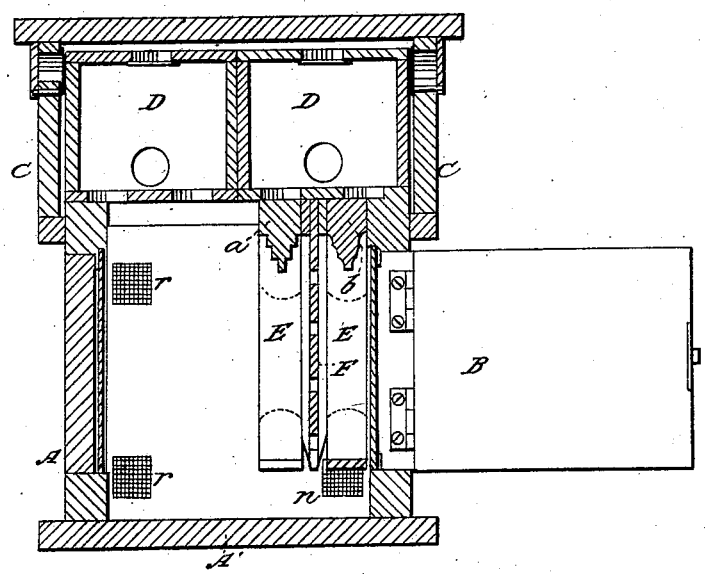
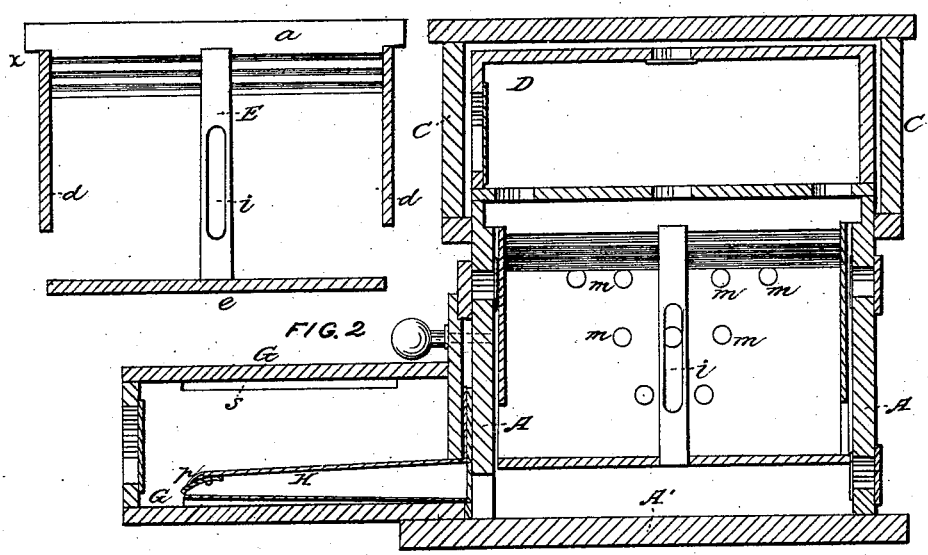
WITNESSES:  INVENTOR:

United States Patent Office.

KIMBALL P. KIDDER, OF BURLINGTON, VERMONT.

Letters Patent No. 64,773, dated May 14, 1867.

---

IMPROVEMENT IN BEE-HIVES.

---

The Schedule referred to in these Letters Patent and making part of the same.

---

TO ALL WHOM IT MAY CONCERN:

Be it known that I, KIMBALL P. KIDDER, of Burlington, in the county of Chittenden, and in the State of Vermont, have invented certain new and useful Improvements in "Bee-Hives;" and do hereby declare that the following is a full, clear, and exact description thereof, reference being had to the accompanying drawings, and to the letters of reference marked thereon.

In the annexed drawings making part of this specification A represents the body of the hive, which sets upon a base or bottom-board, A¹. This body is made of any suitable or convenient size, and provided with doors B, which swing upon suitable hinges. A glass light covers the doorway, so that when the door is swung open, the bee-keeper can see the working of the bees within the hive. Rabbets are formed in the sides of the body A, or in two sides, near their top, for the purpose of sustaining the movable comb-frames. E E represent the movable comb-frames, the ends $x$ $x$ of which extend a little beyond the sides $d$ $d$ of said frames. These ends $x$ $x$ catch upon the rabbets in the sides of the hive, and thus sustain the frames. $a$ $b$ represent the top bars of the frames E. These bars are first provided with a salient angle on their under sides, and then the sides which converge are provided either with a concave groove, as seen in bar $b$, or a step-groove, or groove with a square shoulder, as seen in bar $a$, fig. 1. The lower edge of the bar is slightly flattened. This formation of the under side of the bar gives more surface for the bees in a given space to attach their combs to; and when the comb is once attached it is more secure, and less liable to be broken off or disconnected by any movement of the hive or the comb-frames. $d$ $d$ represent the sides of the frames, which are attached at their upper ends to the bars $a$ or $b$, but have no attachment for their lower ends, said lower ends not reaching down to the bottom strips $e$ of the frames. When these frames are placed in the hive and hung upon the rabbets, their sides are so close to the sides of the hive as not to allow a bee to pass around them between them and the sides of the hive; but they are placed in with sufficient space to allow them to work freely and easily in placing them in and removing them. The bottom strips $e$ of the frames are secured to the lower end of a support which depends from the centre and under side of the top bars. The ends of the bars $e$ project out to or near on a line with the outsides of the side-pieces $d$ $d$. The support which holds the bottom bar is provided with a slot, $i$, which is cut through said support from near its top to near its bottom, if necessary, and is made large or wide enough to allow of the passage of the bees freely through it. This slot enables the bees to pass through the frames for working on either side of the comb or to any portion of the hive, when necessary. F represents the dividing-board or comb-separator, which is made so as to hang upon the rabbets and extends down between the frames. These dividing-boards or separators are provided with holes $m$ $m$, as is customary, and may be constructed in any of the known ways, or after an improved plan which has been patented to me. C represents the cap or cover, which protects the surplus honey-boxes D D. The surplus honey-boxes, which are constructed in any of the known ways, are placed over the frames E E, and the cap C is placed over these boxes, its lower edges resting upon a ledge or flange formed on the outside and top of the body A. H represents a tube, which is connected to the body of the hive at one end, so that the worker-bees and drones can pass into it. This tube or pipe is provided at its outer end with some little wires or pieces of tin, $p$, which are so hinged that the bees can raise them and pass out, but cannot raise them to pass back again. This tube H passes into a box or trap, G, which is made close, with the exception of a slot or slots, $s$, which are made large enough to allow the worker-bees to pass out, but not large enough to allow of the passage of the drones. This device is for the purpose of catching the drones all in the box G, so that they may be killed. The drones could be kept out of the hive to which they belong by means of the tube H, but then they would go to other hives. By means of the trap or box G, as has been stated, they can be caught and destroyed, and thus prevented from entering other hives. The object in having the side-pieces $d$ $d$ fall short of the strips $e$ is to give the bees an opportunity of attaching their combs, near their lower ends, to the sides of the hive. It will be readily seen that when the combs are partially attached to the sides of the hive, they will be more steady, and that the frames will have less weight to support. The bottom A¹ is so attached to the body A as to be easily removed, so that a knife or other sharp instrument can be run in between the combs and the sides of the hive to disengage the combs and allow the frames to be lifted out. In order to run the knife in for disengaging, it will be first necessary to partially invert the hive, as the knife cannot be run in except from the bottom of the comb. It is not necessary that the drone-trap should be constantly used in connection with the hive, as it is only necessary to use it when it is desirable to destroy the drones which may have increased to a troublesome degree in the hive. The body of the hive is of course provided with a slide or regulator for governing the entrance. By means of this slide or regulator the worker-bees can be allowed an entrance or exit, but the opening may be made so small as not to allow of ingress or egress for the drones. This compels the drones to seek egress through the tube, and they are there caught in the trap G. In order to secure a straight comb, it may be necessary to draw a line of melted beeswax along the lower surface of the top bars.

Having thus fully described my invention, what I claim as new, and desire to secure by Letters Patent, is—

1. The arrangement of the frames, having top bars constructed as described, with the support slotted as described, and with the bottom strips *e e*, substantially as herein set forth.

2. The box or trap G, in combination with the tube or passage H, and body A, whereby the drones are allowed to pass out but not to return to the hive, and are caught and separated from the worker-bees, so that they may be destroyed, substantially as set forth.

In testimony that I claim the foregoing I have hereunto set my hand and seal this 31st day of January, 1867.

K. P. KIDDER.

Witnesses:
   C. M. ALEXANDER,
   J. M. MASON.